(12) United States Patent
Liu et al.

(10) Patent No.: US 11,907,846 B2
(45) Date of Patent: Feb. 20, 2024

(54) LEARNING AND PROPAGATING VISUAL ATTRIBUTES

(71) Applicant: NVIDIA CORPORATION, Santa Clara, CA (US)

(72) Inventors: Sifei Liu, Santa Clara, CA (US); Shalini De Mello, San Francisco, CA (US); Varun Jampani, Nashua, NH (US); Jan Kautz, Lexington, MA (US); Xueting Li, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 576 days.

(21) Appl. No.: 17/017,597

(22) Filed: Sep. 10, 2020

(65) Prior Publication Data

US 2022/0076128 A1    Mar. 10, 2022

(51) Int. Cl.
| | | |
|---|---|---|
| *G06K 9/36* | (2006.01) | |
| *G06N 3/084* | (2023.01) | |
| *G06F 18/22* | (2023.01) | |
| *G06F 18/20* | (2023.01) | |
| *G06F 18/214* | (2023.01) | |
| *G06F 18/21* | (2023.01) | |
| *G06N 3/045* | (2023.01) | |

(Continued)

(52) U.S. Cl.
CPC ........... *G06N 3/084* (2013.01); *G06F 18/214* (2023.01); *G06F 18/2163* (2023.01); *G06F 18/22* (2023.01); *G06F 18/29* (2023.01); *G06N 3/045* (2023.01); *G06T 17/00* (2013.01); *G06V 10/82* (2022.01)

(58) Field of Classification Search
CPC ...... G06V 10/82–10/85; G06V 10/454; G06V 10/7635; G06T 2207/20084; G06T 2207/20081; G06T 17/00–17/30; G06T 2200/04; G06T 2207/10028; G06T 7/10–7/194; G06N 3/045–3/0455; G06N 7/01

See application file for complete search history.

(56) References Cited

U.S. PATENT DOCUMENTS

2020/0272888 A1* 8/2020 Wang .................. G06V 40/103

OTHER PUBLICATIONS

Sifei Liu et al., "Learning Propagation for Arbitrarily-structured Data, Supplementary Material", unknown source, unknown date, pp. 1-7. (Year: ?).*

(Continued)

*Primary Examiner* — Brian Werner
(74) *Attorney, Agent, or Firm* — Artegis Law Group, LLP (57) ABSTRACT

One embodiment of the present invention sets forth a technique for performing spatial propagation. The technique includes generating a first directed acyclic graph (DAG) by connecting spatially adjacent points included in a set of unstructured points via directed edges along a first direction. The technique also includes applying a first set of neural network layers to one or more images associated with the set of unstructured points to generate (i) a set of features for the set of unstructured points and (ii) a set of pairwise affinities between the spatially adjacent points connected by the directed edges. The technique further includes generating a set of labels for the set of unstructured points by propagating the set of features across the first DAG based on the set of pairwise affinities.

22 Claims, 5 Drawing Sheets

(51) Int. Cl.
*G06T 17/00* (2006.01)
*G06V 10/82* (2022.01)

(56) References Cited

OTHER PUBLICATIONS

Sifei Liu et al., "Learning Affinity via Spatial Propagation Networks", unknown source, unknown date, pp. 1-11. (Year: ?).*
Liu et al., "Learning Affinity via Spatial Propagation Networks", arXiv:1710.01020v1 [cs.CV] Oct. 3, 2017, 14 pages.
Liu et al., "Learning Propagation for Arbitrarily-structured Data", arXiv:1909.11237v1 [cs.CV] Sep. 25, 2019, 15 pages.
Su et al., "SPLATNet: Sparse Lattice Networks for Point Cloud Processing", arXiv:1802.08275v4 [cs.CV] May 9, 2018, 12 pages.

* cited by examiner

LEARNING AND PROPAGATING VISUAL ATTRIBUTES

BACKGROUND

Field of the Various Embodiments

Embodiments of the present disclosure relate generally to spatial propagation, and more specifically, to learning and propagating visual attributes in arbitrarily structured data.

Description of the Related Art

In computer vision, an affinity matrix includes a generic matrix that characterizes the similarity or closeness of two points in a space. For example, an affinity matrix may store a set of weights for pairs of pixels in an image. Each weight may represent a semantic similarity or closeness between the corresponding pair of pixels; a weight that is closer to 0 indicates a lack of semantic similarity or closeness, while a weight that is closer to 1 indicates a high semantic similarity or closeness.

The affinity matrix may then be used to perform and/or enhance a variety of image processing or computer vision tasks. For example, pairwise affinities between pixels in an image may be used to perform or refine semantic segmentation, coloring, filtering, clustering, and/or other operations related to assigning values to the pixels. More specifically, the pairwise affinities may be used to control the propagation of attributes (e.g., class labels, colors, etc.) related to the operations across the pixels. During this propagation, a given pixel's attribute is updated by scaling the attributes of other pixels by the affinities between the pixel and the other pixels.

However, existing techniques for learning affinities and propagating information based on the affinities typically operate on structured data, such as pixels arranged in regular grids within images or video. As a result, these techniques may not be suitable for use with point clouds and/or other unstructured data that lacks a fixed topology and/or ordering, which limits the ability to perform inference or propagation of class labels, colors, and/or other types of attributes for the unstructured data.

As the foregoing illustrates, what is needed in the art are techniques for determining affinities between and propagating attributes across unstructured data points.

SUMMARY

One embodiment of the present invention sets forth a technique for performing spatial propagation. The technique includes generating a first directed acyclic graph (DAG) by connecting spatially adjacent points included in a set of unstructured points via directed edges along a first direction. The technique also includes applying a first set of neural network layers to one or more images associated with the set of unstructured points to generate (i) a set of features for the set of unstructured points and (ii) a set of pairwise affinities between the spatially adjacent points connected by the directed edges. The technique further includes generating a set of labels for the set of unstructured points by propagating the set of features across the first DAG based on the set of pairwise affinities.

One technological advantage of the disclosed techniques includes increased performance in semantic segmentation, color restoration, and/or other tasks related to the points and/or attributes over conventional techniques that perform pixelwise spatial propagation and/or omit spatial propagation of the attributes. For example, the spatial propagation performed by the disclosed techniques increases the Intersection-over-Union (IoU) between class predictions and ground truth labels in a semantic segmentation task by 2% to 6.5% over baseline semantic segmentation networks, spatial propagation networks that perform pixel-level propagation of segmentation maps, and/or other techniques for learning affinity between points in space. Consequently, the disclosed techniques provide technological improvements in computer systems, applications, frameworks, and/or techniques for performing spatial propagation, semantic segmentation, color restoration, and/or other computer vision tasks.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

General Overview

Computer vision and/or image processing tasks frequently involve determining or refining visual attributes of objects or scenes. For example, an image may be analyzed or processed to identify animals, people, cars, roads, buildings, body parts, clothing, furniture, or other objects in the image; determine the pixel locations of the objects within the image; increase the resolution of the image; or add or enhance colors in the image. Identifying such visual attributes of images is important in many real-world applications, including autonomous vehicles, medical imaging, and robotic automation of manufacturing facilities and other processes.

These types of tasks may be improved by "propagating" the visual attributes across pixels in the image. For example, similarities in the colors, textures, or other characteristics of a pixel and neighboring pixels in the image may be used to update the object represented by the pixel, the pixel's color, or another attribute associated with the pixel. In particular, the attribute of a neighboring pixel with a higher similarity to the pixel may contribute more to the pixel's attribute if the two pixels have a higher similarity; conversely, the neighboring pixel's attribute may have a lower effect on the pixel's updated attribute if the two pixels have a lower similarity. After the pixel's attribute is updated, the updated attribute may be used to generate updates to the attributes of additional neighbors of the pixel (e.g., along a certain direction). After pixel attributes in the image have been propagated along multiple directions (e.g., top to bottom, bottom to top, left to right, right to left), the propagated attribute values for each pixel may be aggregated into a final attribute value for the pixel. This propagation can increase the level of detail and/or accuracy in the final attribute values of the image's pixels.

These propagation techniques can also be adapted to other types of spatially distributed data, such as point clouds, meshes, or superpixels. Unlike pixels in images, these types of data may lack a regular structure, topology, or ordering. To allow visual attributes to be propagated along directions related to the space occupied by the data, spatially adjacent points in the data may be connected by edges along those directions to form one or more directed acyclic graphs (DAGs). These DAGs thus provide a structure and/or ordering of points in the space along which attributes can be propagated.

In turn, propagated attributes associated with the points may be used for a variety of purposes. For example, semantic class labels for pixels in 2D images of a scene around an autonomous vehicle may be propagated in multiple directions across points in a point cloud generated by LIDAR (light detection and ranging), radar (radio detection and ranging), and/or other types of sensors mounted on the autonomous vehicle. The labels may identify nearby roads, buildings, traffic lights, road signs, lane markers, pedestrians, other vehicles, and/or other types of objects, which allows the autonomous vehicle to perform driving-related actions that account for these objects (e.g., based on the position and/or orientation of the autonomous vehicle with respect to the locations of the objects in the scene).

In another example involving robotic automation, semantic labels for furniture, walls, columns, floors, decorations, and/or other objects in images of an indoor space may be propagated across a 3D point cloud or mesh that is generated from a 3D scan of the indoor space. These labels may then be used by a robot to perform actions related to navigating the indoor space and/or interacting with objects in the indoor space. The labels may also, or instead, be used to generate a 3D visualization of the indoor space, which allows a designer or engineer to analyze and/or modify the layout of the indoor space.

In another example involving medical imaging, 3D points collected during a computerized tomography (CT) scan, magnetic resonance imaging (MRI) scan, positron emission tomography (PET) scan, and/or another type of medical scan of one or more objects in a human (or animal) body may be converted into a 3D mesh that includes the 3D points connected by edges to form a number of polygons. Semantic labels for pixels in images captured during the medical scan may be propagated along one or more directions across the 3D mesh, and the propagated labels may be used to detect or locate tumors, diseases, fractures, and/or other medical conditions associated with the scanned object(s). The propagated labels may also, or instead, be colored, highlighted, or otherwise visually indicated in the 3D mesh to assist medical professionals with surgeries or other medical procedures related to the medical conditions.

In another example involving image processing, colors may be propagated across a set of superpixels, a surface in a point cloud or mesh, and/or another collection of unstructured points representing a scene based on sparsely colored pixels in images of the scene. In another example involving semantic labeling of images, labels for parts of objects (e.g., table legs and a table top of a table, individual keys of a keyboard, the lid and container portions of a bottle, body parts of a human or animal, pieces of clothing on a person, etc.) represented by a 3D mesh may be propagated based on the appearance and shape of the objects in images. The propagated labels may then be used to "partition" the mesh into the corresponding object parts and perform additional analysis or visualization related to the partitioned mesh.

System Overview

Figure 1:
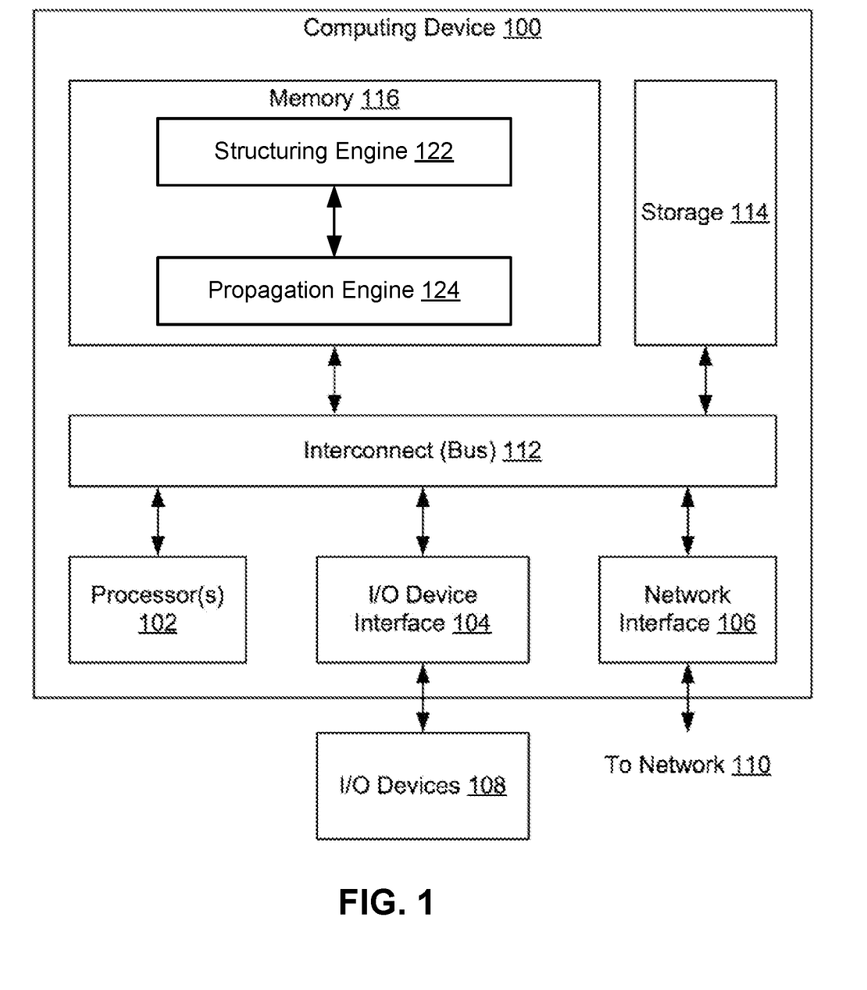
FIG. 1 illustrates a computing device configured to implement one or more aspects of various embodiments.

FIG. 1 illustrates a computing device 100 configured to implement one or more aspects of various embodiments. In one embodiment, computing device 100 may be a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a structuring engine 122 and propagation engine 124 that reside in a memory 116. It is noted that the computing device described herein is illustrative and that any other technically feasible configurations fall within the scope of the present disclosure. For example, multiple instances of structuring engine 122 and propagation engine 124 may execute on a set of nodes in a distributed system to implement the functionality of computing device 100.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

In one embodiment, I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In one embodiment, network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

In one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices. Structuring engine 122 and propagation engine 124 may be stored in storage 114 and loaded into memory 116 when executed.

In one embodiment, memory 116 includes a random access memory (RAM) module, a flash memory unit, or any other type of memory unit or combination thereof. Processing unit(s) 102, I/O device interface 104, and network interface 106 are configured to read data from and write data to memory 116. Memory 116 includes various software programs that can be executed by processor(s) 102 and application data associated with said software programs, including structuring engine 122 and propagation engine 124.

Structuring engine 122 and propagation engine 124 include functionality to learn and perform spatial propagation for arbitrarily structured data. In some embodiments, arbitrarily structured data includes points and/or other entities that lack ordering, fixed topologies, and/or regular layouts. For example, arbitrarily structured data may include point clouds, superpixels, and/or other collections of points in two-dimensional (2D) or three-dimensional (3D) space. This arbitrarily structured data may be contrasted with structured data such as images, which contain pixels that adhere to a regular grid structure, canonical ordering, and fixed topology.

In some embodiments, spatial propagation includes the propagation of attributes across spatially distributed points. For example, spatial propagation may be used to propagate class labels, colors, and/or other attributes associated with the points based on pairwise similarities between pairs of the points with respect to the attributes.

More specifically, structuring engine 122 may define a structure for a set of unstructured points by connecting spatially adjacent points via directed edges along a given direction to form a directed acyclic graph (DAG). Structuring engine 122 may optionally generate additional DAGs by connecting the spatially adjacent points via directed edges along multiple directions (e.g., directions that are orthogonal or opposite one another in the 2D or 3D space). Propagation engine 124 may then propagate attributes such as class labels and/or colors for the set of unstructured points along the directed edges based on unary features for individual points, pairwise features for pairs of points connected by the directed edges, and pairwise affinities between the pairs of points. As described in further detail below, this propagation of attributes across the unstructured points may improve semantic segmentation, color propagation, and/or other computer vision tasks that utilize visual elements of spatially distributed, unstructured data.

Learning and Propagating Visual Attributes

Figure 2:
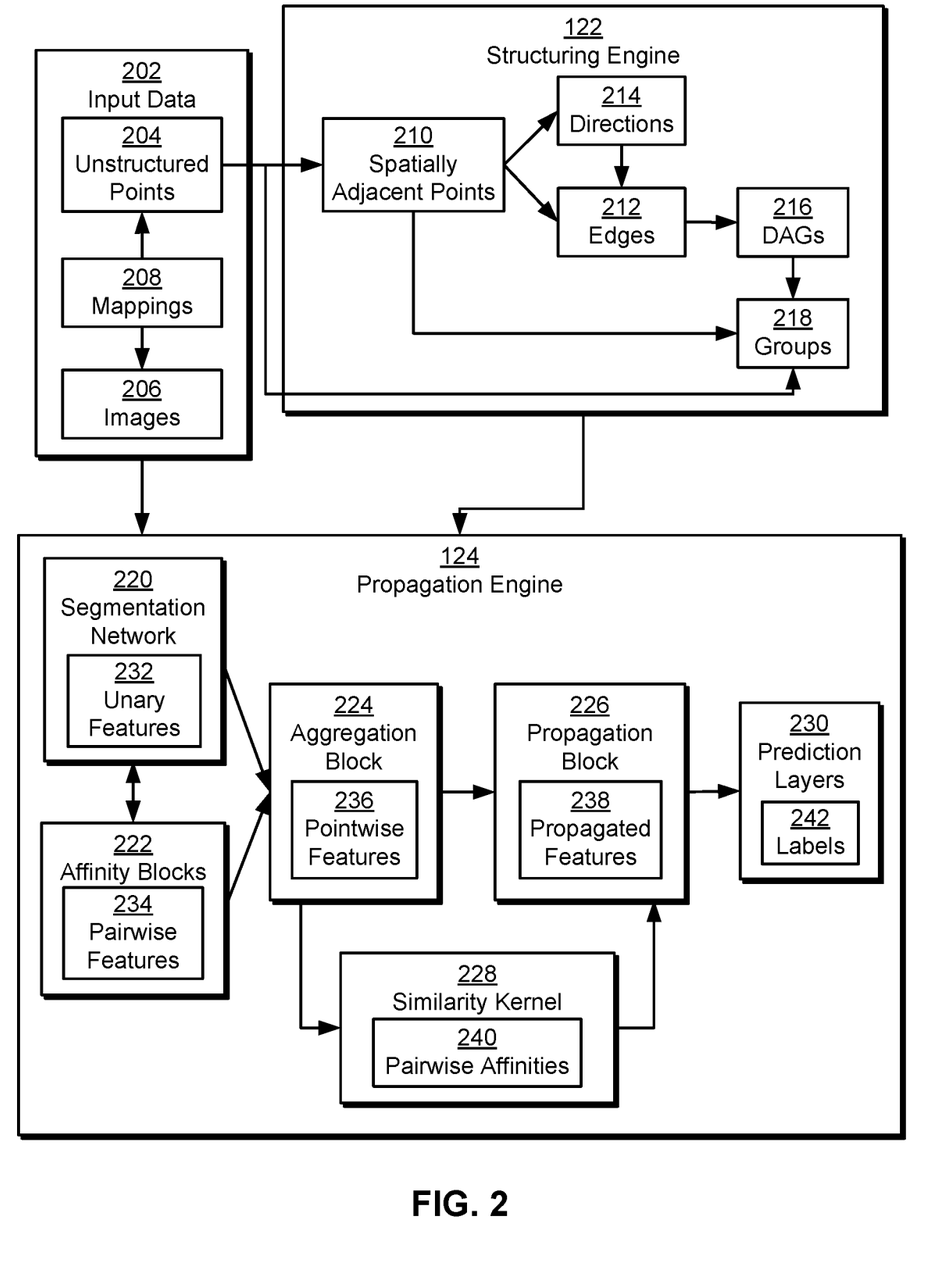
FIG. 2 is a more detailed illustration of the structuring engine and propagation engine of FIG. 1, according to various embodiments.

FIG. 2 is a more detailed illustration of structuring engine 122 and propagation engine 124 of FIG. 1, according to various embodiments. As shown, structuring engine 122 and propagation engine 124 utilize input data 202 that includes a set of unstructured points 204, one or more images 206 associated with unstructured points 204, and mappings 208 between unstructured points 204 and pixels in images 206.

Unstructured points 204 include a collection of spatially distributed points that lack a regular or known structure, ordering, or topology. Images 206 include 2D images of entities corresponding to unstructured points 204, and mappings 208 include spatial correspondences between unstructured points 204 and pixel locations representing unstructured points 204 in images 206. For example, unstructured points 204 may include a point cloud, a set of superpixels, a mesh, and/or a set of voxels that form a 2D or 3D scene. In turn, images 206 may include visible, infrared, X-ray, and/or other types of 2D views captured by cameras of the same scene. Finally, mappings 208 may include one-to-one or one-to-many correspondences between individual unstructured points 204 and 2D pixel locations of those points in images 206. When unstructured points 204 are distributed within a 3D space, mappings 208 may be produced by projecting the 3D locations of unstructured points 204 onto pixel locations in images 206 based on camera parameters (e.g., camera pose, camera model, focal length, principal point, skew or distortion coefficients, reference frame offset, etc.) of one or more cameras used to capture images 206. When unstructured points 204 include superpixels in images 206, mappings 208 may identify segments of pixels corresponding to the superpixels.

Structuring engine 122 includes functionality to convert unstructured points 204 into a structure over which attributes associated with unstructured points 204 can be propagated. As shown, the structure includes a number of DAGs 218. Each DAG includes nodes representing unstructured points 204 and directed edges 212 between pairs of nodes selected from spatially adjacent points 210 in unstructured points 204.

In one or more embodiments, structuring engine 122 uses a k-nearest neighbor search technique to identify spatially adjacent points 210 within the set of unstructured points 204. For example, structuring engine 122 may identify, for each point in unstructured points 204, a list of spatially adjacent points 210 that are closest to the point (e.g., based on Euclidean distance for 2D points and tangent distance for 3D points) and/or within a threshold distance of the point.

Structuring engine 122 also connects spatially adjacent points 210 with edges 212 along a number of directions 214 to generate DAGs 216. In one or more embodiments, directions 214 are orthogonal and/or opposite one another. For example, directions 214 in a 2D space may include positive and negative directions along the X-axis and Y-axis in a 2D coordinate system (e.g., left-to-right, right-to-left, top-to-bottom, bottom-to-top). In another example, directions 214 in a 3D space may include positive and negative directions along the X-, Y-, and Z-axes in a 3D coordinate system.

In some embodiments, each of DAGs 216 includes directed edges 212 that connect spatially adjacent points 210 along a given direction from directions 214. For example, four DAGs 216 may be created for a set of unstructured points 204 along the positive and negative X- and Y-axes in a 2D space, and six DAGs 216 may be created for a set of unstructured point 204 along the positive and negative X-, Y-, and Z-axes in a 3D space. Each DAG may include directed edges 212 that connect pairs of spatially adjacent points 210 along the same direction. Thus, a DAG may be built along the positive X-axis (e.g., left-to-right) direction in the 2D or 3D space by connecting each point in the space with directed edges 212 from up to a pre-specified number of spatially adjacent points 210 (e.g., 4 to 10) that are located to the left of the point. The process may be repeated by connecting each point with different subsets of spatially adjacent points 210 that are located along different directions 214 from the point to form additional DAGs 216 in the same space.

Structuring engine 122 additionally includes functionality to divide each DAG into multiple groups 218 of unstructured points 204 along directions that are orthogonal to those of directed edges 212 in the DAG. In turn, propagation engine 124 may process points in each group in parallel during propagation of features and/or other attributes associated with the points along directed edges 212 of the DAG, as discussed in further detail below.

In one or more embodiments, each of groups 218 includes a subset of unstructured points 204 that are not linked to one another within a corresponding DAG and that include incoming edges 212 only from preceding groups 218 in the DAG. For example, groups 218 in a left-to-right DAG may be created as "columns" of points, where each column contains a subset of points that lack edges 212 with one another and incoming edges 212 from one or more columns to the left of the column.

Structuring engine 122 includes functionality to create groups 218 using a topological sorting technique. For example, structuring engine 122 may perform the following steps to create groups 218:

1: G: DAG to be re-ordered
2: L: an empty list that will contain the groups
3: S: parent nodes in the DAG that lack incoming edges
4: p=1 denotes the index of each group, starting from 1
5: top:
6: if L contains all nodes in G then return
7: loop:
8: remove S from G
9: L(p)←S (note that L(p) is a sub-list of L)
10: for each node m with outgoing edges e from S do
11: remove e from G
12: Update S based on G, p=p+1
13: go to top.

The steps above operate on an input DAG G, which includes a set of nodes S that lack incoming edges. For a left-to-right DAG, S includes a number of unstructured points 204 (i.e., "nodes") that are leftmost in the space within which unstructured points 204 are distributed. The steps also operate on a list L, which is to be populated with multiple groups 218 of unstructured points 204. Within the list, each group is denoted by a separate index p.

More specifically, lines 5-6 in the above steps specify a stopping condition that is met when all nodes in G have been collected into L. While the stopping condition is not met, structuring engine 122 executes a loop that spans lines 7-13. During the first iteration of the loop, nodes in S are removed from G and added to a corresponding group L(p), where p=1. As a result, the first group L(1) includes all nodes in the DAG that represent origin nodes for the direction along which edges 212 in the DAG flow. After the first group is created, outgoing edges 212 from S to individual nodes denoted by m are removed from G, S is updated to include a new set of nodes that lack incoming edges in G, and p is incremented.

Structuring engine 122 repeats the loop until G is empty and all nodes from G have been added to L. During each iteration, structuring engine 122 adds, to L, a new group indexed by the current value of p and that includes the latest set of nodes S that lack incoming edges in the updated DAG G. Structuring engine 122 also removes S and all outgoing edges from S from G, updates S with a new set of nodes in G that lack incoming edges, and increments p. After structuring engine 122 determines that the stopping condition in lines 5-6 is met, structuring engine 122 discontinues execution of the loop. In turn, L includes a list of groups 218 that are ordered along the direction along which edges 212 in the DAG flow. Each group within the list additionally includes a subset of nodes in the DAG that lack edges 212 with one another and contain only incoming edges 212 from preceding groups 218 in the list.

In some embodiments, propagation engine 124 uses input data 202, DAGs 216, and/or groups 218 to perform spatial propagation of labels 242 associated with pixels in images 206 across unstructured points 204. As shown, propagation engine 124 performs processing using a segmentation network 220, a set of affinity blocks 222, an aggregation block 224, a propagation block 226, a similarity kernel 228, and a set of prediction layers 230. Each of these components is described in further detail below.

Propagation engine 124 applies segmentation network 220 to images 206 to generate unary features 232 for individual pixels in images 206. For example, segmentation network 220 may include a convolutional neural network (CNN), recurrent neural network (RNN), residual neural network (ResNet), and/or another type of deep neural network that performs semantic segmentation of images 206. As a result, unary features 232 may include representations of predicted class labels for individual pixels in images 206.

In some embodiments, segmentation network 220 is replaced with a different neural network or component for generating other types of unary features 232 related to unstructured points 204. For example, propagation engine 124 may obtain unary features 232 as sparsely colored pixels in one or more images 206 for use in propagating the colors to non-colored regions in the image(s). In another example, propagation engine 124 may obtain unary features 232 as a partial segmentation mask for an object in one or more images 206 (e.g., a subset of pixels in the object that are labeled as the object) for use in propagating the segmentation mask to the remainder of the object in the image(s). In a third example, unary features 232 may include representations of class labels, colors, and/or other attributes that are generated by a 3D CNN for unstructured points 204, in lieu of or in addition to unary features 232 produced by a 2D CNN for images 206 associated with unstructured points 204. In one or more of these examples, unary features 232 may be provided by users (e.g., by "drawing" the colors or partial segmentation mask over one or more images 206 and/or representations of unstructured points 204) and/or generated by one or more neural network layers or blocks.

Like segmentation network 220, affinity blocks 222 include one or more CNN, RNN, ResNet, and/or other types of neural network layers. These layers may be applied to output from one or more portions of segmentation network 220 to generate pairwise features 234 for individual pixels in images 206, as described in further detail below with respect to FIG. 3.

In one or more embodiments, input into segmentation network 220 and affinity blocks 222 includes geometric information related to individual unstructured points 204 in a point cloud (or another set of 3D points), in addition to images 206 of objects represented by the point cloud. For example, propagation engine 124 may generate the geometric information as the concatenation of the coordinate gradient of each unstructured point (e.g., dX, dY, and dZ for X-, Y, and Z-coordinates of the point); the surface normal; and the color of the unstructured point. Propagation engine 124 uses mappings 208 from each unstructured point to the corresponding pixels in images 206 to form a nine-channel input map with the same resolution as the input images 206 and applies a Conv+ReLu unit to the input map. Propagation engine 124 then uses the output of the Conv+ReLu unit as input into segmentation network 220 and affinity blocks 222.

Aggregation block 224 is used to aggregate unary features 232 and/or pairwise features 234 into pointwise features 236 for individual unstructured points 204. For example, aggregation block 224 may calculate a pointwise unary feature for an unstructured point as the average (or another aggregation) of unary features 232 for a set of pixels with mappings 208 to the unstructured point. Aggregation block 224 may also calculate an overall pairwise feature for the same unstructured point as the average (or another aggregation) of pairwise features 234 for the same set of pixels.

In some embodiments, pairwise features 234 represent lower-level and/or higher-resolution features than the corresponding unary features 232. For example, pairwise features 234 may be used to identify edges or boundaries of objects in images 206. In turn, pairwise features 234 aggregated into corresponding pointwise features 236 by aggregation block 224 are used by similarity kernel 228 to compute pairwise affinities 240 between pairs of unstructured points 204 that are connected by one or more directed edges 212 in DAGs 216. For example, similarity kernel 228 may calculate a pairwise affinity between two unstructured points 204 connected by an edge in a DAG as a measure of similarity between a first average value of a first set of pairwise features 234 for a first set of pixels with mappings 208 to the first unstructured point and a second average value of a second set of pairwise features 234 for a second set of pixels with mappings 208 to the second unstructured point.

Propagation block 226 is then used to generate a set of propagated features 238 for unstructured points 204 by propagating pointwise features 236 across directed edges 212 in DAGs 216 based on the corresponding pairwise affinities 240 from similarity kernel 228. During this propagation, a propagated feature (e.g., one of propagated features 238) for an unstructured point in the first DAG may be calculated based on a sum of a subset of pointwise features 236 for a subset of unstructured points 204 with outgoing edges 212 to the unstructured point in a corresponding DAG, where each of the features is weighted by a pairwise affinity between the unstructured point and a corresponding unstructured point.

In turn, propagation engine 124 may use propagation block 226 to produce a different set of propagated features 238 for each DAG (e.g., by propagating pointwise features 236 along the direction denoted by edges 212 in the DAG). For example, propagation block 226 may be used to propagate pointwise features 236 representing aggregated unary features 232 for unstructured points 204 along the top-to-bottom, bottom-to-top, left-to-right, and right-to-left directions 214 denoted by directed edges 212 in four DAGs 216 created from a set of superpixels, a point cloud representing a flat surface, and/or another set of unstructured points 204 that is substantially distributed in a 2D space. In another example, propagation block 226 may be used to propagate pointwise features 236 representing aggregated unary features 232 along the positive and negative directions 214 along the X-, Y-, and Z-axes in a 3D space, as represented by directed edges 212 in six DAGs 216 created from a mesh, a point cloud representing a 3D surface or volume, and/or another set of unstructured points 204 that is distributed in the 3D space. In both examples, each direction of propagation results in a separate set of propagated features 238 for the corresponding unstructured points 204.

In one or more embodiments, each of DAGs 216 is represented as a set of vertices (i.e., unstructured points 204) $V = \{v_1, \ldots, v_N\}$, and each vertex $v_i$ includes a set of neighbors connected to the vertex as $K_i$. Thus, a left-to-right DAG for a set of unstructured points 204 in a point cloud includes, for a given vertex $v_i$, a subset of unstructured points 204 $K_i$ that are adjacent to $v_i$ in the DAG and located spatially to the left of the vertex in the 3D space of the point cloud. Each vertex is also associated with a pointwise unary feature (e.g., one of pointwise features 236) represented by $v \in R_{N \times c}$ and a propagated feature (e.g., one of propagated features 238) represented by $h \in R^{N \times c}$. Both u and h are c-channel feature maps. In turn, propagation block 226 updates the value of h for vertices of the DAG along the corresponding direction (e.g., one of directions 214) using the following propagation operator:

$$h(i) = \left(1 - \sum_{k \in K_i} g_{ik}\right) u(i) + \sum_{k \in K_i} g_{ik} h(k), \quad (1)$$

where $\{g_{ik}\}$ represents a set of learnable pairwise affinities 240, or "edge representations," between $v_i$ and $v_k$.

As mentioned above, propagation engine 124 includes functionality to perform parallel propagation of pointwise features 236 for unstructured points 204 in individual groups 218 generated by structuring engine 122 from a given DAG. In some embodiments, propagation engine 124 may perform propagation of pointwise features 236 in a "time-step" manner, where each of groups 218 corresponds to a different time step and propagation of pointwise features 236 is performed for all points in a given group simultaneously. Thus, pointwise features 236 and propagated features 238 for vertices in the $p^{th}$ group can be denoted as $u_p$ and $h_p$, respectively, and propagation for each group can be performed as a linear combination of all preceding groups 218 in the DAG:

$$h_p = (1 - d_p) u_p + \sum_{v=1}^{p-1} w_{pq} h_q, \quad (2)$$

where q is a group that precedes the group p along the direction of propagation.

Referring to Equation 2, if the $p^{th}$ and $q^{th}$ groups contain $m_p$ and $m_q$ vertices, respectively, $w_{pq}$ is a $m_p \times m_q$ matrix that contains all weights $\{g\}$ between vertices in $h_p$ and $h_q$. In particular, $d_p \in R^{m \times m}$, is a diagonal degree matrix with a non-zero entry at i that aggregates information from all $w_{pq}$ as:

$$d_p(i, i) = \sum_{g=1}^{p-1} \sum_{j=1}^{m_q} w_{pq}(i, j). \quad (3)$$

With T groups 216 in the DAG, this parallel "time-step" propagation includes a computational complexity of O(T).

As illustrated in Equation 1, an edge representation produced by similarity kernel 228 $\{g_{ik}\}$ dictates the extent to which the pointwise feature for a vertex is passed to the vertex's neighbor. For the task of semantic segmentation, {$g_{ik}$} may represent a semantic edge, where $g_{ik}=0$ stops propagation across categories and $g_{ik}>0$ allows for propagation within a category. As a result, edge representations may be learned and conditioned on values associated with pixels in images 206 that have mappings 208 to the corresponding unstructured points 204.

In one or more embodiments, similarity kernel 228 includes a differentiable symmetric kernel function κ, such that $g_{ik}=κ(x_i, x_j)$, $j∈ K_i$, where $x_i$ and $x_j$ represent aggregated pairwise features 234 (e.g., produced by aggregation block 224 as a subset of pointwise features 236) for vertices $v_i$ and $v_j$. For example, κ can be defined as an inner-product similarity with the following representation:

$$κ(x_i, x_j)\hat{x}_i^T \hat{x}_j \qquad (4)$$

In the above representation, represents a normalized feature vector, which can be computed in a CNN via layer normalization.

In another example, the similarity kernel κ can be computed in an embedding space via a Gaussian function with the following representation:

$$κ(x_i, x_j) = e^{-\|x_i - x_j\|_F^2} \qquad (5)$$

Because $g_{ik}$ can include negative values, a learnable bias term may be added to the embedded Gaussian and initialized with a value of −0.5.

After propagated features 238 are produced by propagation block 226 for all DAGs 216 and corresponding directions 214, propagation engine 124 uses one or more prediction layers 230 to generate a final set of labels 242 for unstructured points 204 from propagated features 238. For example, prediction layers 230 may include a max pooling layer that aggregates multiple sets of propagated features 238 produced by propagation block 226 from multiple DAGs 216 into a single set of propagated features 238 for unstructured points 204. Prediction layers 230 may also include one or more densely connected, tanh, softmax, and/or other layers that perform additional processing related to the aggregated propagated features 238. Output by prediction layers 230 may then be used as scores (e.g., between 0 and 1) that represent predicted likelihoods of classes, colors, and/or other types of labels 242 for unstructured points 204.

In some embodiments, propagation engine 124 includes functionality to distribute processing related to segmentation network 220 and affinity blocks 222 across multiple GPUs and/or other types of processors. For example, images 206 may include multi-view images of a scene represented by unstructured points 204 in a point cloud. Propagation engine 124 may input each image into a different GPU and use a copy of segmentation network 220 and affinity blocks 222 on each GPU to generate unary features 232 and pairwise features 234 for pixels in the image with mappings 208 to unstructured points 204. As a result, propagation engine 124 may include functionality to generate unary features 232 and pairwise features 234 by executing multiple GPUs in parallel, which reduces computation time and/or increases the efficiency with which unary features 232 and pairwise features 234 are produced for all images 206. Propagation engine 124 may then collect unary features 232 and pairwise features 234 from multiple GPUs into a single GPU, CPU, and/or another type of processor and execute aggregation block 224, similarity kernel 228, and propagation block 226 on the processor to generate pointwise features 236, pairwise affinities 240, and propagated features 238, respectively. As discussed above, additional parallel processing may be performed by propagation block 226 during generation of propagated features 238 for individual groups 218 of unstructured points 204 at the same time. Finally, propagation engine 124 may apply prediction layers 230 to propagated features 238 on the same processor to produce a final set of labels 242 for unstructured points 204.

In turn, labels 242 produced by propagation engine 124 or unstructured points 204 may be used for a variety of purposes. For example, semantic labels 242 assigned to points in a point cloud may be used by an autonomous vehicle to identify nearby roads, buildings, traffic lights, pedestrians, other vehicles, and/or other types of objects and perform driving-related actions that account for these objects. In another example, semantic labels 242 for 2D or 3D points in a medical scan may be used to detect tumors, diseases, fractures, and/or other medical conditions. In a third example, labels 242 may include colors that are propagated across a set of superpixels, a surface in a point cloud or mesh, and/or another collection of unstructured points 204 based on sparsely colored pixels in images 206. Consequently, structuring engine 122 and propagation engine 124 may include functionality to perform and/or improve a variety of computer vision tasks.

In one or more embodiments, segmentation network 220 and affinity blocks 222 are jointly trained with aggregation block 224, propagation block 226, similarity kernel 228, prediction layers 230, and/or other components used by propagation engine 124 to produce labels 242 for unstructured points 204. For example, aggregation block 224, propagation block 226, similarity kernel 228, and prediction layers 230 may be embedded in an architecture for segmentation network 220 and/or affinity blocks 222. Because segmentation network 220, affinity blocks 222, aggregation block 224, propagation block 226, similarity kernel 228, and prediction layers 230 are all differentiable, a loss calculated from labels 242 outputted by prediction layers 230 and ground truth labels for a corresponding training dataset may be backpropagated across all layers of segmentation network 220, affinity blocks 222, aggregation block 224, propagation block 226, similarity kernel 228, and prediction layers 230, and stochastic gradient descent and/or another optimization technique may be used to update parameters of each layer based on the negative gradients of the backpropagated errors. In other words, spatial propagation performed by propagation engine 214 may be optimized for use with a variety of network architectures, types of unstructured points 204 or images 206, and/or tasks.

Those skilled in the art will appreciate that the functionality of structuring engine 122 and/or propagation engine 124 may be varied and/or adapted to different types of data. For example, structuring engine 122 may convert unstructured points 204 into undirected graphs, mixed graphs, fully connected graphs, trees, grids, clusters, paths, splines, and/or other types of structures that represent relationships between or among spatially distributed points. Each structure may be produced by connecting two or more points in unstructured points 204 (or other types of spatially distributed data) by one or more edges, lines, and/or curves and/or grouping various subsets of the points based on distance or other attributes. In another example, propagation engine 124 may generate labels 242 for other types of spatially distributed data with varying levels of structure, such as pixels in images, meshes, and/or voxel grids. In a third example, propagation engine 124 may use affinity blocks 222 and/or similarity kernel 228 to calculate features and/or affinities for groups of more than two points, such as all points that are within a threshold distance of a "target" point in input data 202. In a fourth example, propagation engine 124 may use propagation block 226 to propagate features from points that are within a certain distance, number of hops, and/or another threshold of a target point to the target point.

Figure 3:
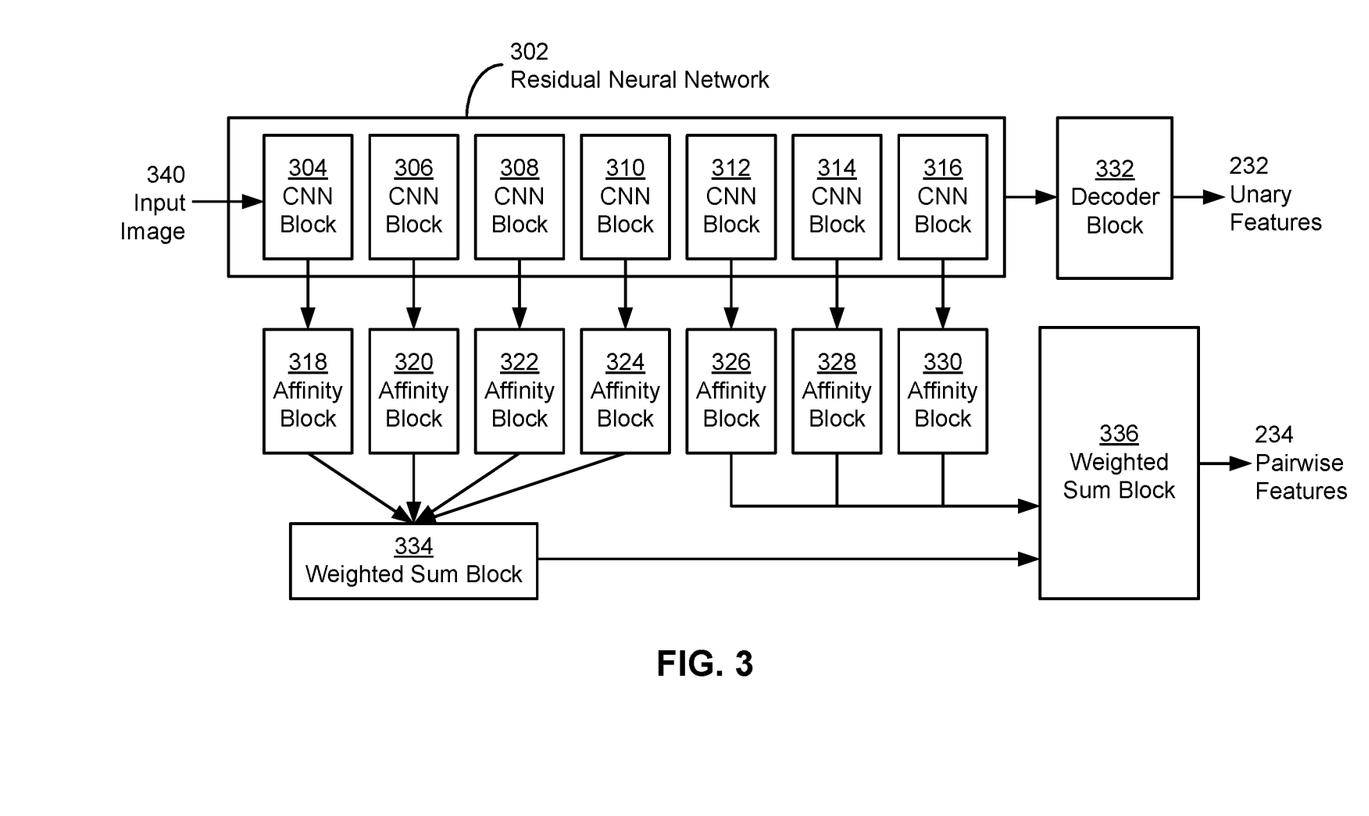
FIG. 3 is an example architecture for the segmentation network and affinity blocks of FIG. 2, according to various embodiments.

FIG. 3 is an example architecture for segmentation network 220 and affinity blocks 222 of FIG. 2, according to various embodiments. As shown, the example architecture includes a residual neural network (ResNet) 302 that includes a number of CNN blocks 302-316. The output of ResNet 302 is provided to a decoder block 332 that produces unary features 232 for pixels in an input image 340 (e.g., one of images 206 in FIG. 2), as well as a number of affinity blocks 318-330 and two weighted sum blocks 334-336 that produce pairwise features 232 for the same pixels. In this example architecture, ResNet 302 and decoder 332 represent segmentation network 220 in FIG. 2, and affinity blocks 318-339 and weighted sum blocks 334-336 represent affinity blocks 222 in FIG. 2.

In some embodiments, ResNet 302 includes a wide ResNet38 architecture. As a result, CNN blocks 304-316 may represent residual units; each residual unit includes a residual link from the input to the residual unit to the output of the residual unit. Each of the first five CNN blocks 304-312 may include a chain of two sets of layers; each set of layers may include a batch normalization layer followed by a ReLu layer followed by a Conv3×3 layer. Each of the last two CNN blocks 314-316 may include a chain of three sets of layers. The first and third sets of layers may include a batch normalization layer followed by a ReLu layer followed by a Conv1×1 layer, and the second set of layers may include a batch normalization layer followed by a ReLu layer followed by a Conv3×3 layer.

In the example architecture of FIG. 3, decoder block 332 represents a decoder module for segmentation network 220. For example, decoder block 332 may include a Deeplab decoder module that is used to refine semantic segmentation results outputted by ResNet 302 from input image 340. In turn, the output of decoder block 332 may be used as unary features 232 for pixels in input image 340.

Those skilled in the art will appreciate that ResNet 302 and decoder block 332 may be replaced with other neural network architectures. For example, the functionality of segmentation network 220 may be provided by a dilated residual network (DRN), which includes a series of residual blocks followed by two dilated convolutional layers. The output of the last dilated convolutional layer may then be used as unary features 232 for input image 340.

As shown, the output of each CNN block (e.g., CNN blocks 304-316) is fed to a corresponding affinity block (e.g., affinity blocks 318-330). In this example architecture, the first four affinity blocks 318-324 may include a convolutional layer followed by a ReLu layer followed by a convolutional layer, and the last three affinity blocks 328-330 may include a convolutional layer. The output of the first four affinity blocks 318-324 is fed into a first weighted sum block 334, and the outputs of weighted sum block 334 and the last three affinity blocks 326-330 are fed into a second weighted sum block 336. Each of weighted sum blocks 334-336 uses a weighted sum with learnable scalar weights to calculate an output value from the corresponding inputs, and the output of weighted sum block 336 is used as pairwise features 234 for pixels in input image 340.

Figure 4:
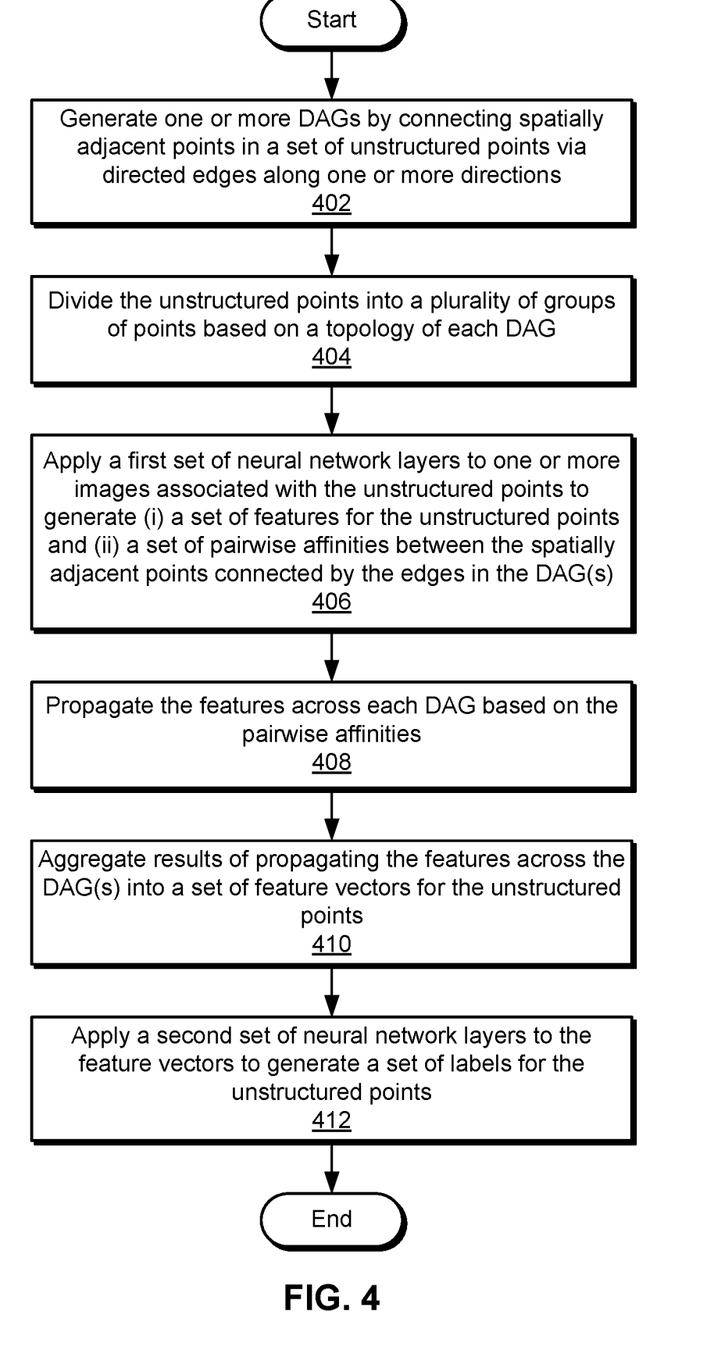
FIG. 4 is a flow chart of method steps for performing spatial propagation, according to various embodiments.

FIG. 4 is a flow chart of method steps for performing spatial propagation, according to various embodiments. Although the method steps are described in conjunction with the systems of FIGS. 1 and 2, persons skilled in the art will understand that any system configured to perform the method steps in any order falls within the scope of the present disclosure.

As shown, structuring engine 122 generates 402 one or more DAGs by connecting spatially adjacent points in a set of unstructured points via directed edges along one or more directions. For example, structuring engine 122 may use a k-nearest neighbor search technique to identify, for each point in the set of unstructured points, spatially adjacent points that are closest to the point (e.g., based on Euclidean distance for 2D points and tangent distance for 3D points) and/or within a threshold distance of the point. Structuring engine 122 may then generate each DAG by connecting a certain number of spatially adjacent points that are to a certain side of a given point to the point via directed edges from the spatially adjacent points to the point. These directions may additionally be orthogonal or opposite to one another in a 2D or 3D space occupied by the unstructured points. Thus, structuring engine 122 may create, for a set of superpixels and/or other types of unstructured points in a 2D space, four DAGs with directed edges in the positive and negative directions along the X-axis and Y-axis in the 2D space. When the unstructured points represent a point cloud and/or other types of points in a 3D space, structuring engine 122 may create six DAGs with directed edges along the positive and negative X-, Y-, and Z-axes in the 3D space.

Next, structuring engine 122 divides 404 the unstructured points into a plurality of groups of points based on a topology of each DAG. For example, structuring engine 122 may use a topological sorting technique to generate multiple groups of points in each DAG, so that each group includes a subset of the unstructured points that are not linked to one another in a corresponding DAG and also includes incoming edges only from one or more groups that precede the group along the direction represented by edges in the DAG.

Propagation engine 124 then applies 406 a first set of neural network layers to one or more images associated with the unstructured points to generate (i) a set of features for the unstructured points and (ii) a set of pairwise affinities between spatially adjacent points connected by edges in the DAGs, as described in further detail below with respect to FIG. 5. Propagation engine 124 also generates a set of labels for the unstructured points.

More specifically, propagation engine 124 propagates 408 the features across each DAG based on the pairwise affinities. For example, propagation engine 124 may update a unary feature for a given unstructured point in each DAG based on a sum of a subset of unary features for a subset of unstructured points with outgoing edges to the unstructured point in the DAG, weighted by a subset of pairwise affinities between the subset of unstructured points and the unstructured point. Propagation engine 124 may optionally perform such propagation in a parallel "time-step" manner using the groups of unstructured points generated in operation 404. For example, propagation engine 124 may perform parallel propagation of a subset of unary features from a first group to a second group that is connected to the first group to reduce computation time associated with perform spatial propagation across multiple DAGs and/or a large number of unstructured points.

After the features have been propagated across every DAG, propagation engine 124 aggregates 410 results of propagating the features across the DAG(s) into a set of feature vectors for the unstructured points and applies 412 a second set of neural network layers to the feature vectors to generate a set of labels for the unstructured points. For example, propagation engine 124 may use an element-wise max pooling layer and/or another type of aggregation layer to combine multiple sets of propagated features from multiple DAGs into a single set of feature vectors for the unstructured points. Propagation engine 124 may then apply one or more prediction layers to the feature vectors to convert the feature vectors into predicted likelihoods of classes, colors, and/or other labels for the unstructured points.

Figure 5:
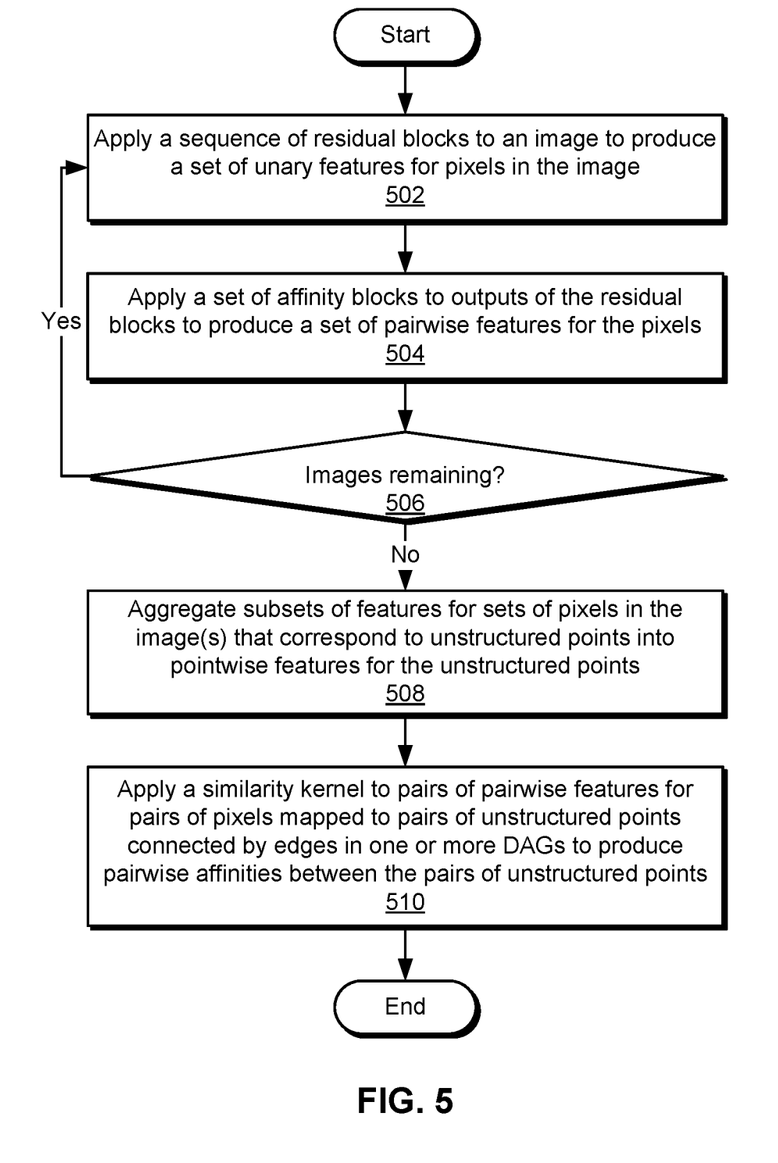
FIG. 5 is a flow chart of method steps for generating features and pairwise affinities for a set of unstructured points, according to various embodiments.

FIG. 5 is a flow chart of method steps for generating features and pairwise affinities for a set of unstructured points, according to various embodiments. Although the method steps are described in conjunction with the systems of FIGS. 1 and 2, persons skilled in the art will understand that any system configured to perform the method steps in any order falls within the scope of the present disclosure.

As shown, propagation engine 124 applies 502 a sequence of residual blocks to an image to produce a set of unary features for pixels in the image. For example, propagation engine 124 may use a wide ResNet38, DRN, and/or another type of residual network to generate the unary features from the image.

Next, propagation engine 124 applies 504 a set of affinity blocks to outputs of the residual blocks to produce a set of pairwise features for the pixels. For example, propagation engine 124 may use the output of each residual block as input into a corresponding affinity block. Each affinity block may include one or more convolutional, ReLu, and/or other types of layers. The output of the affinity blocks may aggregated using one or more rounds of weighted sums, and a set of pairwise features for pixels in the image may be obtained as the output of one of the weighted sums.

Operations 502-504 may be repeated for remaining 506 images associated with the set of unstructured points. For example, propagation engine 124 may input a series of multi-view images corresponding to a point cloud into the residual blocks and affinity blocks to produce the unary and pairwise features for all of the images. In some embodiments, operations 502-504 may be carried out in parallel on multiple GPUs or other types of processors. As a result, each processor may calculate the unary and pairwise features for a different subset of images.

After unary and pairwise features have been calculated for all images associated with the unstructured points, propagation engine 124 aggregates 508 subsets of features for sets of pixels in the image(s) that correspond to unstructured points into pointwise features for the unstructured points. For example, propagation engine 124 may calculate a pointwise unary feature for each unstructured point as the average unary feature from all pixels that map to the unstructured point in the image(s). Propagation engine 124 may also calculate an overall pairwise feature for each unstructured point as the average pairwise feature from all pixels that map to the unstructured point in the image(s).

Propagation engine 124 then applies 510 a similarity kernel to pairs of pairwise features for pairs of pixels mapped to pairs of unstructured points connected by edges in one or more DAGs to produce pairwise affinities between the pairs of unstructured points. For example, propagation engine 124 may calculate each pairwise affinity by applying an inner product and/or embedded Gaussian kernel to over- all pairwise features for each pair of unstructured points. Alternatively, propagation engine 124 may calculate a separate pairwise affinity between two pairwise features for each pair of pixels that maps to the pair of unstructured points and aggregate (e.g., average) multiple pairwise affinities for multiple pairs of pixels that correspond to the pair of unstructured points into an overall pairwise affinity between the unstructured points. The pointwise unary features and overall pairwise affinities for the unstructured points may then be used to propagate the unary features across one or more DAGs created from the unstructured points, as discussed above.

In sum, the disclosed techniques perform spatial propagation of attributes across a set of unstructured points and inference of labels associated with the unstructured points based on the propagated attributes. To provide a structure or ordering over which the attributes can be propagated, one or more DAGs may be formed from the unstructured points. Each DAG may include directed edges along a corresponding direction between pairs of spatially adjacent points in the set of unstructured points. A variety of neural networks and/or techniques may be used to obtain or generate unary features related to the attributes for individual pixels in one or more images, wherein at least a portion of the pixels corresponds to representations of the unstructured points in the image(s). The unary features may be inputted into a set of affinity blocks, and a set of pairwise features for the pixels and/or unstructured points may be obtained as output from the affinity blocks. The unary and pairwise features for pixels mapped to each unstructured point may be averaged or otherwise aggregated into pointwise features for the unstructured point, and a similarity kernel may be applied to pairs of the aggregated pairwise features to calculate pairwise affinities between pairs of unstructured points connected by directed edges in the DAG(s). The unary features are then propagated along the directed edges of each DAG based on the corresponding pairwise affinities, so that a higher pairwise affinity results in greater propagation of a unary feature from an origin point to a destination point and a lower pairwise affinity results in less propagation of the unary feature from the origin point to the destination point. The propagated features may then be aggregated and/or analyzed by additional neural network layers to produce labels such as classes represented by the unstructured points, colors of the unstructured points, and/or other attributes.

This generation of unary and pairwise features and/or propagation of features across points in each DAG may be performed in a parallel manner (e.g., on multiple processing nodes), which improves efficiency and/or reduces computation time over conventional techniques that perform spatial propagation and/or feature generation in a sequential manner. Additional improvements in resource overhead and/or computational efficiency may be obtained by propagating the features across a number of unstructured points (e.g., points in a point cloud, superpixels, etc.) instead of a much larger number of pixels in images of the same object or scene. Finally, the disclosed techniques provide performance improvements in semantic segmentation, color restoration, and/or other computer vision tasks related to the points and/or attributes over conventional techniques that perform pixelwise spatial propagation and/or omit spatial propagation of the attributes. For example, the spatial propagation performed by the disclosed techniques increases the Intersection-over-Union (IoU) between class predictions and ground truth labels in a semantic segmentation task by 2% to 6.5% over baseline semantic segmentation networks, spatial propagation networks that perform pixel-level propagation of segmentation maps, and/or other techniques for learning affinity between points in space. Consequently, the disclosed techniques provide technological improvements in computer systems, applications, frameworks, and/or techniques for performing spatial propagation, semantic segmentation, color restoration, and/or other computer vision tasks.

1. In some embodiments, a method for performing spatial propagation comprises generating a first structure by connecting two or more points included in a set of spatially distributed points; applying a first set of neural network layers to one or more images associated with the set of spatially distributed points to generate (i) a set of features for the set of spatially distributed points and (ii) a set of affinities between the two or more points; and generating a set of labels for the set of spatially distributed points by propagating the set of features across the first structure based on the set of affinities.

2. The method of clause 1, further comprising generating one or more structures by connecting two or more additional points included in the set of spatially distributed points via one or more edges along one or more directions; and generating the set of labels by propagating the set of features across the one or more structures based on the set of affinities for the two or more additional points.

3. The method of any of clauses 1-2, wherein generating the set of labels comprises aggregating a first result of propagating the set of features across the first structure and one or more results of propagating the set of features across the one or more structure into a set of feature vectors for the set of spatially distributed points; and applying a second set of neural network layers to the set of feature vectors to generate the set of labels.

4. The method of any of clauses 1-3, wherein the one or more directions comprise a second direction that is orthogonal to the first direction and a third direction that is opposite the first direction.

5. The method of any of clauses 1-4, wherein applying the first set of neural network layers to the one or more images comprises applying a sequence of residual blocks to an image to produce a first unary feature for a first pixel in the image.

6. The method of any of clauses 1-5, wherein applying the first set of neural network layers to the one or more images further comprises applying a set of affinity blocks to a first set of outputs of the set of residual blocks to produce a first pairwise feature for the first pixel.

7. The method of any of clauses 1-6, wherein applying the first set of neural network layers to the one or more images further comprises applying a similarity kernel to the first pairwise feature and a second pairwise feature for a second pixel in the image to produce a pairwise affinity between the first pixel and the second pixel.

8. The method of any of clauses 1-7, wherein applying the set of affinity blocks to the first set of outputs of the set of residual blocks comprises producing the first pairwise feature as a weighted sum of a second set of outputs of the set of affinity blocks.

9. The method of any of clauses 1-8, wherein applying the first set of neural network layers to the one or more images comprises aggregating a subset of the set of features for a set of pixels in the one or more images that correspond to a first spatially distributed point into one or more pointwise features for the first spatially distributed point; and calculating a pairwise affinity between the first spatially point and a second spatially distributed point based on a similarity between a first pairwise feature in the one or more pointwise features and a second pairwise feature for the second unstructured point.

10. The method of any of clauses 1-9, wherein propagating the set of features across the first structure comprises updating a feature for a first point in the first structure based on a sum of a subset of the set of features for a subset of the set of spatially distributed points with outgoing edges to the first point in the first structure weighted by a subset of the set of pairwise affinities between the subset of the set of spatially distributed points and the first point.

11. The method of any of clauses 1-10, wherein propagating the set of features across the first structure comprises dividing the set of spatially distributed points into a plurality of groups of points based on a topology of the first structure, wherein each group included in the plurality of groups of points comprises (i) a subset of the spatially distributed points that are not linked to one another in the first structure and (ii) incoming edges from one or more groups included in the plurality of groups that precede the group along the first direction in the first structure; and propagating in parallel a subset of the set of features from a first group in the plurality of groups to a second group in the plurality of groups that is connected to the first group by a subset of the one or more edges.

12. The method of any of clauses 1-11, wherein connecting the two or more points comprises connecting two or more spatially adjacent points included in the set of spatially distributed points via directed edges along a first direction.

13. The method of any of clauses 1-12, wherein the first structure comprises a directed acyclic graph (DAG).

14. The method of any of clauses 1-13, wherein the set of spatially distributed points comprises at least one of a point cloud or one or more superpixels.

15. The method of any of clauses 1-14, wherein the set of labels comprises at least one of a class label or a color.

16. In some embodiments, a non-transitory computer readable medium stores instructions that, when executed by a processor, cause the processor to perform the steps of generating a first directed acyclic graph (DAG) by connecting spatially adjacent points included in a set of unstructured points via directed edges along a first direction; applying a first set of neural network layers to one or more images associated with the set of unstructured points to generate (i) a set of features for the set of unstructured points and (ii) a set of pairwise affinities between the spatially adjacent points connected by the directed edges; and generating a set of labels for the set of unstructured points by propagating the set of features across the first DAG based on the set of pairwise affinities.

17. The non-transitory computer readable medium of clause 16, wherein the steps further comprise generating one or more DAGs by connecting the spatially adjacent points included in the set of unstructured points via additional directed edges along one or more directions; and generating the set of labels by propagating the set of features across the one or more DAGs based on the set of pairwise affinities for the additional directed edges.

18. The non-transitory computer readable medium of any of clauses 16-17, wherein generating the set of labels comprises aggregating a first result of propagating the set of features across the first DAG and one or more results of propagating the set of features across the one or more DAGs into a set of feature vectors for the set of unstructured points; and applying a second set of neural network layers to the set of feature vectors to generate the set of labels.

19. The non-transitory computer readable medium of any of clauses 16-18, wherein applying the first set of neural network layers to the one or more images comprises applying a sequence of residual blocks to an image to produce a first unary feature for a first pixel in the image; applying a set of affinity blocks to a first set of outputs of the set of residual blocks to produce a first pairwise feature for the first pixel; and applying a similarity kernel to the first pairwise feature and a second pairwise feature for a second pixel in the image to produce a pairwise affinity between the first pixel and the second pixel.

20. The non-transitory computer readable medium of any of clauses 16-19, wherein the similarity kernel comprises at least one of an inner product and an embedded Gaussian.

21. The non-transitory computer readable medium of any of clauses 16-20, wherein applying the first set of neural network layers to the one or more images comprises generating the set of features in parallel on a plurality of processors; and aggregating the set of features into the set of pairwise affinities between the spatially adjacent points connected by the directed edges.

22. In some embodiments, a system comprises a memory that stores instructions, and a processor that is coupled to the memory and, when executing the instructions, is configured to generate a first directed acyclic graph (DAG) by connecting spatially adjacent points included in a set of spatially distributed points via directed edges along a first direction; apply a first set of neural network layers to one or more images associated with the set of spatially distributed points to generate (i) a set of features for the set of spatially distributed points and (ii) a set of pairwise affinities between the spatially adjacent points connected by the directed edges; and generate a set of labels for the set of spatially distributed points by propagating the set of features across the first DAG based on the set of pairwise affinities.

23. In some embodiments, a method for analyzing image data comprises generating a first structure by connecting a set of points included in a point cloud that is generated based on measurements by one or more sensors on an autonomous vehicle; applying a first set of neural network layers to one or more images associated with the point cloud to generate (i) a set of features for the set of points and (ii) a set of affinities between pairs of points included in the set of points; generating a set of labels for the set of points by propagating the set of features across the first structure based on the set of affinities; and causing the autonomous vehicle to perform a driving action based on a position of the autonomous vehicle with respect to one or more objects represented by the set of labels and the set of points.

24. The method of clause 23, wherein the one or more objects comprise at least one of a vehicle, a pedestrian, a road, a building, a traffic light, a road sign, and a lane marker.

25. In some embodiments, a method for analyzing image data comprises converting a medical scan of one or more objects into a three-dimensional (3D) mesh; applying a first set of neural network layers to one or more images collected during the medical scan to generate (i) a set of features for a set of points in the 3D mesh and (ii) a set of affinities between pairs of points connected by edges in the 3D mesh; assigning a set of labels associated with the one or more objects to the set of points by propagating the set of features across one or more directions in the 3D mesh based on the set of affinities; and generating, based on the set of labels, output for assisting with a medical procedure related to the medical scan.

26. The method of clause 25, wherein the medical scan comprises at least one of a computerized tomography (CT) scan, a magnetic resonance imaging (MRI) scan, and a positron emission tomography (PET) scan.

27. In some embodiments, a method for analyzing image data comprises generating a first structure by connecting a set of points included in a point cloud that is generated based on a scan of an indoor space; applying a first set of neural network layers to one or more images associated with the point cloud to generate (i) a set of features for the set of points and (ii) a set of affinities between pairs of points included in the set of points; generating a set of labels for the set of points by propagating the set of features across the first structure based on the set of affinities; and causing a robot to perform an action related to interacting with the indoor space based on a position of the robot with respect to one or more objects represented by the set of labels.

28. The method of clause 27, wherein the one or more objects comprise at least one of a floor, a wall, a decoration, and a piece of furniture.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for performing spatial propagation, comprising:
    generating a first structure by connecting two or more points included in a set of spatially distributed points;
    applying a first set of neural network layers to one or more images associated with the set of spatially distributed points to generate (i) a set of features for the set of spatially distributed points and (ii) a set of affinities between the two or more points; and
    generating a set of labels for the set of spatially distributed points by propagating the set of features across the first structure based on the set of affinities.

2. The method of claim 1, further comprising:
    generating one or more structures by connecting two or more additional points included in the set of spatially distributed points via one or more edges along one or more directions; and
    generating the set of labels by propagating the set of features across the one or more structures based on the set of affinities for the two or more additional points.

3. The method of claim 2, wherein generating the set of labels comprises:
    aggregating a first result of propagating the set of features across the first structure and one or more results of propagating the set of features across the one or more structures into a set of feature vectors for the set of spatially distributed points; and
    applying a second set of neural network layers to the set of feature vectors to generate the set of labels.

4. The method of claim 2, wherein the one or more directions comprise a second direction that is orthogonal to the first direction and a third direction that is opposite the first direction.

5. The method of claim 1, wherein applying the first set of neural network layers to the one or more images comprises applying a sequence of residual blocks to an image to produce a first unary feature for a first pixel in the image.

6. The method of claim 5, wherein applying the first set of neural network layers to the one or more images further comprises applying a set of affinity blocks to a first set of outputs of the set of residual blocks to produce a first pairwise feature for the first pixel.

7. The method of claim 6, wherein applying the first set of neural network layers to the one or more images further comprises applying a similarity kernel to the first pairwise feature and a second pairwise feature for a second pixel in the image to produce a pairwise affinity between the first pixel and the second pixel.

8. The method of claim 6, wherein applying the set of affinity blocks to the first set of outputs of the set of residual blocks comprises producing the first pairwise feature as a weighted sum of a second set of outputs of the set of affinity blocks.

9. The method of claim 1, wherein applying the first set of neural network layers to the one or more images comprises:
    aggregating a subset of the set of features for a set of pixels in the one or more images that correspond to a first spatially distributed point into one or more pointwise features for the first spatially distributed point; and
    calculating a pairwise affinity between the first spatially distributed point and a second spatially distributed point based on a similarity between a first pairwise feature in the one or more pointwise features and a second pairwise feature for the second unstructured point.

10. The method of claim 1, wherein propagating the set of features across the first structure comprises updating a feature for a first point in the first structure based on a sum of a subset of the set of features for a subset of the set of spatially distributed points with outgoing edges to the first point in the first structure weighted by a subset of the set of pairwise affinities between the subset of the set of spatially distributed points and the first point.

11. The method of claim 1, wherein propagating the set of features across the first structure comprises:
dividing the set of spatially distributed points into a plurality of groups of points based on a topology of the first structure, wherein each group included in the plurality of groups of points comprises (i) a subset of the spatially distributed points that are not linked to one another in the first structure and (ii) incoming edges from one or more groups included in the plurality of groups that precede the group along the first direction in the first structure; and
propagating in parallel a subset of the set of features from a first group in the plurality of groups to a second group in the plurality of groups that is connected to the first group by a subset of the one or more edges.

12. The method of claim 1, wherein connecting the two or more points comprises connecting two or more spatially adjacent points included in the set of spatially distributed points via directed edges along a first direction.

13. The method of claim 1, wherein the first structure comprises a directed acyclic graph (DAG).

14. The method of claim 1, wherein the set of spatially distributed points comprises at least one of a point cloud or one or more superpixels.

15. The method of claim 1, wherein the set of labels comprises at least one of a class label or a color.

16. A non-transitory computer readable medium storing instructions that, when executed by a processor, cause the processor to perform the steps of:
generating a first directed acyclic graph (DAG) by connecting spatially adjacent points included in a set of unstructured points via directed edges along a first direction;
applying a first set of neural network layers to one or more images associated with the set of unstructured points to generate (i) a set of features for the set of unstructured points and (ii) a set of pairwise affinities between the spatially adjacent points connected by the directed edges; and
generating a set of labels for the set of unstructured points by propagating the set of features across the first DAG based on the set of pairwise affinities.

17. The non-transitory computer readable medium of claim 16, wherein the steps further comprise:
generating one or more DAGs by connecting the spatially adjacent points included in the set of unstructured points via additional directed edges along one or more directions; and
generating the set of labels by propagating the set of features across the one or more DAGs based on the set of pairwise affinities for the additional directed edges.

18. The non-transitory computer readable medium of claim 17, wherein generating the set of labels comprises:
aggregating a first result of propagating the set of features across the first DAG and one or more results of propagating the set of features across the one or more DAGs into a set of feature vectors for the set of unstructured points; and
applying a second set of neural network layers to the set of feature vectors to generate the set of labels.

19. The non-transitory computer readable medium of claim 16, wherein applying the first set of neural network layers to the one or more images comprises:
applying a sequence of residual blocks to an image to produce a first unary feature for a first pixel in the image;
applying a set of affinity blocks to a first set of outputs of the set of residual blocks to produce a first pairwise feature for the first pixel; and
applying a similarity kernel to the first pairwise feature and a second pairwise feature for a second pixel in the image to produce a pairwise affinity between the first pixel and the second pixel.

20. The non-transitory computer readable medium of claim 19, wherein the similarity kernel comprises at least one of an inner product and an embedded Gaussian.

21. The non-transitory computer readable medium of claim 16, wherein applying the first set of neural network layers to the one or more images comprises:
generating the set of features in parallel on a plurality of processors; and
aggregating the set of features into the set of pairwise affinities between the spatially adjacent points connected by the directed edges.

22. A system, comprising:
a memory that stores instructions, and
a processor that is coupled to the memory and, when executing the instructions, is configured to:
generate a first directed acyclic graph (DAG) by connecting spatially adjacent points included in a set of spatially distributed points via directed edges along a first direction;
apply a first set of neural network layers to one or more images associated with the set of spatially distributed points to generate (i) a set of features for the set of spatially distributed points and (ii) a set of pairwise affinities between the spatially adjacent points connected by the directed edges; and
generate a set of labels for the set of spatially distributed points by propagating the set of features across the first DAG based on the set of pairwise affinities.

* * * * *